(12) United States Patent
Bernreitner et al.

(10) Patent No.: US 9,040,633 B2
(45) Date of Patent: May 26, 2015

(54) IMPACT-MODIFIED POLYPROPYLENE

(75) Inventors: Klaus Bernreitner, Linz (AT); Tung Pham, Linz (AT); Jens Reussner, Eidenberg (AT)

(73) Assignee: Borealis Technology Oy, Porvoo (FI)

( * ) Notice: Subject to any disclaimer, the term of this patent is extended or adjusted under 35 U.S.C. 154(b) by 592 days.

(21) Appl. No.: 12/734,368

(22) PCT Filed: Oct. 27, 2008

(86) PCT No.: PCT/EP2008/064517
§ 371 (c)(1),
(2), (4) Date: Apr. 27, 2010

(87) PCT Pub. No.: WO2009/056517
PCT Pub. Date: May 7, 2009

(65) Prior Publication Data
US 2010/0256304 A1    Oct. 7, 2010

(30) Foreign Application Priority Data
Oct. 31, 2007    (EP) ..................................... 07119709

(51) Int. Cl.
| | |
|---|---|
| C08L 23/00 | (2006.01) |
| C08L 23/08 | (2006.01) |
| C08L 9/00 | (2006.01) |
| C08L 23/10 | (2006.01) |
| C08L 23/12 | (2006.01) |
| C08L 23/14 | (2006.01) |

(52) U.S. Cl.
CPC ............... C08L 23/0815 (2013.01); C08L 9/00 (2013.01); C08L 23/0807 (2013.01); C08L 23/10 (2013.01); C08L 23/12 (2013.01); C08L 23/142 (2013.01)

(58) Field of Classification Search
CPC ............................... C08L 9/00; C08L 23/0815
USPC ......................................................... 525/240
See application file for complete search history.

(56) References Cited

U.S. PATENT DOCUMENTS

| | | | |
|---|---|---|---|
| 4,948,840 A | 8/1990 | Berta | |
| 5,082,732 A * | 1/1992 | Ueda et al. .................... | 428/402 |
| 5,639,816 A * | 6/1997 | Yamaguchi et al. ........... | 524/451 |
| 6,262,175 B1 * | 7/2001 | Jury et al. ....................... | 525/93 |
| 2005/0032981 A1 | 2/2005 | Yu et al. | |
| 2005/0113521 A1 | 5/2005 | Pelliconi et al. | |
| 2006/0281868 A1 | 12/2006 | Sudhin et al. | |
| 2007/0021561 A1 * | 1/2007 | Tse et al. ........................ | 525/88 |
| 2007/0037913 A1 * | 2/2007 | Heck .............................. | 524/451 |
| 2007/0135580 A1 * | 6/2007 | Tirelli et al. ................... | 525/240 |
| 2007/0208139 A1 * | 9/2007 | Raulie et al. ................... | 525/240 |

FOREIGN PATENT DOCUMENTS

| | | |
|---|---|---|
| EP | 1 655 332 A1 | 5/2006 |
| WO | WO 2004/087803 A1 | 10/2004 |

OTHER PUBLICATIONS

Dynasol Solprene 200, flyer, 1996.*
Kraton D1101 flyer, 1996.*
He et al, J. Applied Polymer Science, vol. 31, 873-884, 1986.*
Babu et al, eXPRESS Polymer Letters, v.4, 2010, 197-209.*
Cowie, J.M.G.; "Chemie und Physik der synthetischen Polymeren" (authorised translation from "Polymers: Chemistry and Physics of Modem Materials"); © 1991; pp. 296-305; Blackie Academic and Professional; London, UK.
Röthemeyer & Sommer; "Kautschuktechnologie"; pp. 77-80; http://www.hanser.de/3-446-40480-5; ISBN 3-446-40480-5; Werstoffe-Verabeitung-Produkte.
Zhang & Rajan; "Polymer Data Handbook"; © 1999; pp. 607-608 & 620-621; Oxford University Press, Inc.
Hofmann, Werner; "Rubber Technology Handbook" (revised version of "Kautschuk-Technologie", translated by Dr. Rudolph Bauer and Prof. Dr. E.A. Meinecke); © 1980 (original German edition); ISBN 1-56990-145-7 Hanser/Gardner Publications; Cincinnati, OH.
Vasile, Cornelia (edited by); "Handbook of Polyolefins" Second Edition; © 2000; sections VII & VIII; Marcel Dekker Inc., New York, New York (eastern hemisphere distribution by: Marcel Dekker AG, Basel, Swutzerland).
EXXPRO; "National Industrial Chemicals Notification and Assessment Scheme"; Public Report; http://www.nicnas.gov.au/search/cache.cgi?collection=nicnas-web&doc; Nov. 9, 1993; pp. 1-7.

* cited by examiner

Primary Examiner — Irina Krylova
(74) Attorney, Agent, or Firm — Warn Partners, P.C.

(57) ABSTRACT

The present invention relates to a polymer composition, comprising: (i) a polypropylene matrix; (ii) a first elastomeric phase dispersed within the matrix and having a glass transition temperature Tg1, measured with dynamical mechanical thermal analysis according to ISO 6721-2, wherein the first elastomeric phase comprises an ethylene copolymer having comonomer units derived from $C_3$ to $C_8$ olefins; (iii) a second elastomeric phase dispersed within the matrix, wherein the second elastomeric phase is crosslinked and has a glass transition temperature Tg2, measured with dynamical mechanical thermal analysis according to ISO 6721-2, within the range of −70° C. to −90° C., wherein the difference between Tg1 and Tg2 is at least 15° C. and Tg1 is higher than Tg2.

12 Claims, 2 Drawing Sheets

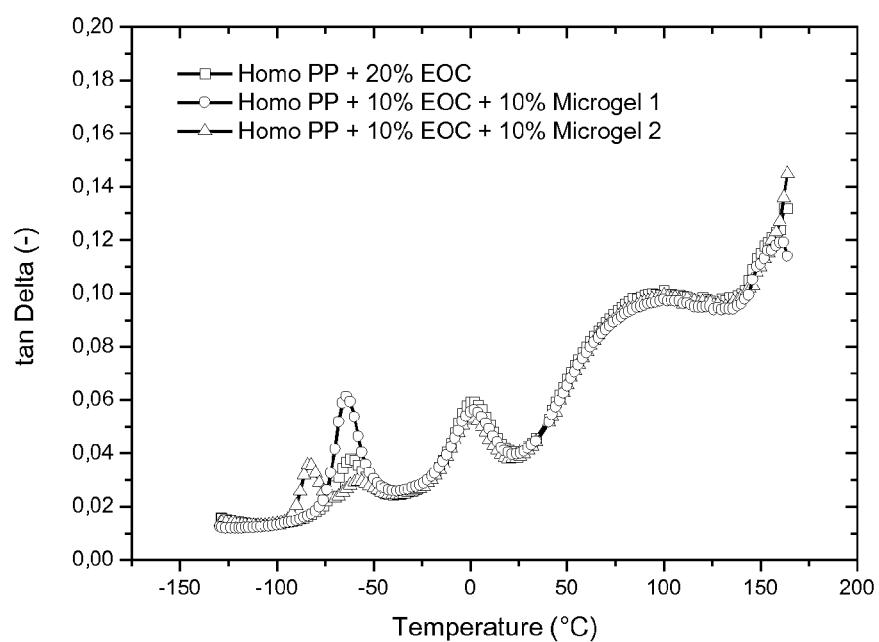
Fig.1: DMTA curves

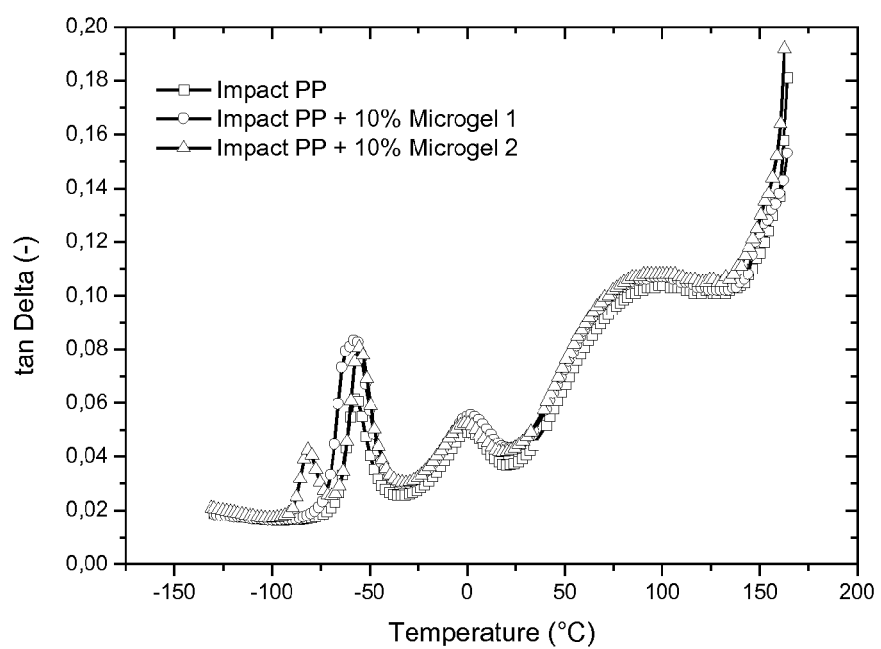
Fig. 2: DMTA curves

IMPACT-MODIFIED POLYPROPYLENE

This application is a National Stage of International Application No. PCT/EP2008/064517, filed Oct. 27, 2008. This application claims priority to European Patent Application No. EP 07119709.9 filed on Oct. 31, 2007. The disclosures of the above applications are incorporated herein by reference.

The present invention relates to a polymer composition having high impact strength, in particular at low temperature, and to a preparation process of said composition.

The economical success of polypropylene is based on its processability and wide applicability. Applications of polypropylene can be found in a number of different areas such as packaging, automotive and electronics industry.

However, due to the fact that polypropylene has a glass transition temperature at about 0° C., it is brittle at low temperature, thereby hindering its use for low temperature applications. For improving impact strength of polypropylene, it is known to include an elastomeric phase, e.g. made of ethylene-propylene rubber (EPR) or ethylene-propylene-diene copolymer (EPDM).

GB-A 1,156,813 discloses a propylene polymer blend containing 65 to 96 wt % of a propylene polymer with less than 10 wt % comonomer, 2 to 20 wt % EPR or EPDM and 5 wt % of an ethylene polymer with less than 5 wt % comonomer.

WO 02/44272 discloses polyolefin compositions containing 85 to 98 wt % of a propylene/alpha-olefin copolymer as matrix and a propylene/alpha-olefin rubber copolymer and 2 to 15 wt % of an ethylene polymer having a density less than 925 kg/m$^3$ and being a homopolymer or an ethylene copolymer with an alpha-olefin having 4 to 10 carbon atoms.

U.S. Pat. No. 4,113,806 discloses polypropylene impact blends containing 70 to 90 wt % of a propylene polymer with a melt flow rate between 0.5 to 30 g/10 min, 2 to 24 wt % of EPR or EPDM with more than 50 wt % ethylene, and 1 to 18 wt % low density polyethylene.

It is also known to use crosslinked elastomers such as polybutadiene rubber, styrene-butadiene rubber or acrylate rubber as polymer additives. If pre-crosslinked, these elastomers can be prepared as discrete particles of stable morphology which are subsequently added to the polymer. Sometimes, these crosslinked elastomers are referred to as microgels. Originally, microgels were used in the rubber industry to improve performance of elastomeric materials.

EP 0405216 discloses a mixtures of polychloroprene and another rubber containing C=C double bonds, wherein 1 to 20% by weight of the polychloroprene is sulfur-modified and crosslinked.

EP 0575851 discloses a mixtures of polybutadiene gel and other rubbers containing C=C double bonds, wherein the amount of polybutadiene gel is 1 to 70% by weight.

It is also known to add crosslinked elastomers to thermoplastic polymers.

WO 2005/033185 discloses a thermoplastic elastomer composition comprising at least one thermoplastic material and at least one microgel which is based on homopolymers or random copolymers and which is not crosslinked by high energy radiation.

However, there is still a need in modified polypropylene which can be used in low temperature applications while reducing the risk of brittle failure.

Thus, it is an object of the present invention to provide a polypropylene having high impact strength at low temperature. However, this property should not be achieved on the expense of other mechanical properties such as flexural modulus or flexural strength.

According to the present invention, the object is solved by providing a polymer composition, comprising
(i) a polypropylene matrix,
(ii) a first elastomeric phase dispersed within the matrix and having a glass transition temperature Tg1, measured with dynamical mechanical thermal analysis according to ISO 6721-2, wherein the first elastomeric phase comprises an ethylene copolymer having comonomer units derived from $C_3$ to $C_8$ olefins,
(iii) a second elastomeric phase dispersed within the matrix, wherein the second elastomeric phase is crosslinked and has a glass transition temperature Tg2, measured with dynamical mechanical thermal analysis according to ISO 6721-2, within the range of −70° C. to −90° C.,
wherein the difference between Tg1 and Tg2 is at least 15° C. and Tg1 is higher than Tg2.

The Propylene Homo- or Copolymer Constituting the Matrix

The polypropylene constituting the matrix can be a propylene homopolymer, a propylene copolymer, or a blend thereof.

In case it is a propylene copolymer, it preferably has comonomers derived from olefins selected from the group consisting of ethylene, $C_4$ to $C_{20}$ olefins, more preferably ethylene, $C_4$ to $C_8$ olefins, or any mixture thereof. Preferably, the amount of comonomers is less than 8.0 wt %, more preferably less than 5.0 wt %, and even more preferably less than 3.0 wt %, based on the weight of the propylene copolymer.

In a preferred embodiment, it is a propylene homopolymer which constitutes the matrix.

Preferably, the propylene homo- or copolymer constituting the matrix has a melt flow rate MFR$_2$(230° C.) within the range of 1 to 100 g/10 min, more preferably within the range of 5 to 50 g/10 min, and even more preferably within the range of 8 to 30 g/10 min.

To provide a material with sufficient stiffness, the propylene homo- or copolymer constituting the matrix is preferably present in an amount of at least 60 wt %, more preferably at least 80 wt %, based on the weight of the polymer composition.

Preferably, the propylene homo- or copolymer constituting the matrix is made with a Ziegler-Natta catalyst or a metallocene catalyst.

In a preferred embodiment, the polypropylene constituting the matrix has a rather broad molecular weight distribution (MWD), more preferably the polypropylene is multimodal, even more preferred bimodal. "Multimodal" or "multimodal distribution" describes a frequency distribution that has several relative maxima. In particular, the expression "modality of a polymer" refers to the form of its molecular weight distribution (MWD) curve, i.e. the appearance of the graph of the polymer weight fraction as a function of its molecular weight. If the polymer is produced in a sequential step process, i.e. by utilizing reactors coupled in serial configuration, and using different conditions in each reactor, the different polymer fractions produced in the different reactors each have their own molecular weight distribution which may considerably differ from one another. The molecular weight distribution curve of the resulting final polymer can be seen as super-imposing of molecular weight distribution curves of the individual polymer fractions which will, accordingly, show distinct maxima, or at least be distinctively broadened compared with the curves for individual fractions.

A polymer showing such molecular weight distribution curve is called bimodal or multimodal, respectively.

As stated above, the polypropylene constituting the matrix is preferably multimodal, more preferably bimodal. Accordingly it is preferred that the polypropylene constituting the matrix has a molecular weight distribution (MWD) of 5 to 60, more preferably in the range of 8 to 25.

However, it is also possible to use a monomodal polypropylene. If used, it preferably has an MWD of 3 to 8, more preferably 4 to 7.

Moreover the polypropylene constituting the matrix preferably has a weight average molecular weight ($M_w$) of 100,000 to 900,000 g/mol, more preferably in the range of 150,000 to 500,000 g/mole.

The propylene homo- or copolymer constituting the matrix may be produced by a single- or multistage process polymerisation of propylene or propylene with alpha-olefin and/or ethylene such as bulk polymerisation, gas phase polymerisation, solution polymerisation or combinations thereof using conventional catalysts. A homo- or copolymer can be made either in loop reactors or in a combination of loop and gas phase reactor. Those processes are well known to one skilled in the art.

A suitable catalyst for the polymerisation of the propylene polymer is any stereospecific catalyst for propylene polymerisation which is capable of polymerising and copolymerising propylene and comonomers at a temperature of 40 to 110° C. and at a pressure from 10 to 100 bar. Ziegler-Natta catalysts (especially a high yield Ziegler-Natta system containing Ti, Cl, Mg and Al) as well as metallocene catalysts are suitable catalysts.

The First Elastomeric Phase

As indicated above, the polymer composition of the present invention comprises a first elastomeric phase dispersed within the matrix and having a glass transition temperature Tg 1, wherein the first elastomeric phase comprises an ethylene copolymer having comonomer units derived from $C_3$ to $C_8$ olefins.

As used in the present invention, the term "elastomeric phase" corresponds to the commonly accepted meaning and refers to a phase comprising a polymeric material of more or less amorphous nature.

The first elastomeric phase is dispersed within the propylene homo- or copolymer matrix, i.e. it does not form a continuous phase but is rather present as separated areas distributed throughout the polypropylene constituting the matrix.

In a preferred embodiment, the olefinic copolymer is an ethylene/propylene copolymer. Due to its elastomeric properties, it is also referred to as ethylene/propylene rubber (EPR).

Preferably, the ethylene/propylene copolymer has an amount of propylene units in the range of 25 to 75 wt %, more preferably 30 to 70 wt %, even more preferably 35 to 65 wt %, most preferably 40 to 58 wt %, based on the weight of the ethylene/propylene rubber.

Preferably, the intrinsic viscosity of the ethylene/propylene copolymer of the first elastomeric phase is 1 to 3.5 dl/g, more preferably from 1.1 to 3.3 dl/g. Below an intrinsic viscosity of 1.0 dl/g, the impact strength of the polymer composition might be adversely affected, particularly at sub-zero temperatures. When the intrinsic viscosity is more than 3.5 dl/g, shrinkage might be too high.

An ethylene/propylene elastomeric copolymer may be produced by known polymerisation processes such as solution, suspension and gas-phase polymerisation using conventional catalysts. Ziegler-Natta catalysts as well as metallocene catalysts are suitable catalysts.

A widely used process is the solution polymerisation. Ethylene, propylene and catalyst systems are polymerised in an excess of hydrocarbon solvent. Stabilisers and oils, if used, are added directly after polymerisation. The solvent and unreacted monomers are then flashed off with hot water or steam, or with mechanical devolatilisation. The polymer, which is in crumb form, is dried with dewatering in screens, mechanical presses or drying ovens. The crumb is formed into wrapped bales or extruded into pellets.

The suspension polymerisation process is a modification of bulk polymerisation. The monomers and catalyst system are injected into the reactor filled with propylene. The polymerisation takes place immediately, forming crumbs of polymer that are not soluble in the propylene. By flashing off the propylene and comonomers, the polymerisation process is completed.

The gas-phase polymerisation technology uses one or more vertical fluidised beds. Monomers and nitrogen in gas form along with catalyst are fed to the reactor and solid product is removed periodically. Heat of reaction is removed through the use of the circulating gas that also serves to fluidise the polymer bed. Solvents are not used, thereby eliminating the need for solvent stripping, washing and drying.

The production of ethylene-propylene elastomeric copolymers is also described in detail in e.g. U.S. Pat. No. 3,300,459, U.S. Pat. No. 5,919,877, EP 0 060 090 A1 and in a company publication by EniChem "DUTRAL, Ethylene-Propylene Elastomers", pages 1-4 (1991).

Alternatively, elastomeric ethylene-propylene copolymers, which are commercially available and which fulfil the indicated requirements, can be used.

If the elastomeric ethylene copolymer, e.g. the ethylene-propylene rubber, is prepared separately from the polypropylene constituting the matrix, it can be subsequently blended with the matrix polymer by any conventional blending means, e.g. melt blending in an extruder.

Alternatively, the ethylene-propylene rubber can be prepared as a reactor blend together with the propylene homo- or copolymer constituting the matrix, e.g. starting with the production of the matrix polymer in a loop reactor and transferring the product into a gas phase reactor, where the elastomeric copolymer is polymerised.

Preferably, a dispersion of the first elastomeric phase, e.g. the ethylene/$C_3$ to $C_8$ copolymer such as ethylene-propylene rubber, within the matrix polymer is produced by performing a second polymerization stage in the presence of particles of matrix polymer, e.g. as a second polymerization stage of a multistage polymerization. Preferably the combination of the matrix and elastomer polymers is produced in a two stage polymerization using two or more polymerization reactors, more preferably using bulk and gas phase reactors (especially fluidized bed gas phase reactors), especially preferably using a loop reactor followed by two gas phase reactors or by a loop and a gas phase reactor. In such a procedure, the catalyst system used may be varied between stages but is preferably the same for all stages. Especially preferably, a prepolymerized heterogeneous (i.e. supported) catalyst is used.

While the catalyst may be a metallocene, it is preferred to use Ziegler Natta catalysts, e.g. an inorganic halide (e.g. $MgCl_2$) supported titanium catalyst, together with an aluminium alkyl (e.g. triethylaluminium) cocatalyst. Silanes, e.g. dicyclopentanedimethoxysilane (DCPDMS) or cyclohexylmethyldimethoxysilane (CHMDMS), may be used as external donors. Such catalyst systems are described in EP 0 491 566 A1.

Preferably, the reactor blend, i.e. the polypropylene matrix in combination with the EPR dispersed therein, has a melt flow rate $MFR_2$(230° C.) within the range of 1 to 100, more preferably 1 to 50 g/10 min, even more preferably 5 to 30 g/10 min.

In another preferred embodiment, the elastomeric ethylene copolymer is an ethylene/$C_4$-$C_8$ copolymer, e.g. ethylene/butene-1, ethylene/hexene-1, ethylene/octene-1 or ethylene/hexene-1/butene-1 copolymers. Preferably, the elastomeric ethylene copolymer is an ethylene/1-octene copolymer.

Preferably, the ethylene/$C_4$-$C_8$ copolymer, e.g. the ethylene/1-octene copolymer has an amount of comonomer units, e.g. 1-octene units, within the range of 5 to 50 wt %, more preferably 10 to 45 wt %, even more preferably 15 to 42 wt %, based on the weight of the ethylene/$C_4$-$C_8$ copolymer.

Preferably, the elastomeric ethylene/$C_4$-$C_8$ copolymer, e.g. the ethylene/1-octene copolymer, is prepared with a single-site catalyst and may be obtained using a variety of known polymerization processes for the manufacture of linear polyethylene including processes that operate in solution, in the gas phase or as a slurry process. Ethylene copolymers made with the single site catalysts are commercially available and may be manufactured in accordance with processes disclosed in Modern Plastics, p. 15, May 1993, Plastics Focus Vol. 25, No. 12, Jun. 21, 1993 and in Exxon Chemical Exact Facts, Vol. 1, No. 1, February 1993. By the term "single-site catalyst" is meant a metallocene or constrained geometry catalyst. Metallocene catalysts are organometallic co-ordination compounds obtained as a cyclopentadienyl (Cp) derivative of a transition metal or metal halide. Metallocene catalysts systems are extremely sensitive to the geometry of the catalytic site at the transition metal (the "single-site"). Examples of single-site catalysts include $Cp_2 TiCl_2$, $Cp_2 ZrCl_2$, $Cp_2 HfCl_2$, $(C_5 (CH_3)_5)_2 TiCl_2$, $Ph_2 Me (Ind)_2 ZrCl_2$, $[Me_4 CpSi(Me)_2 N(t-Bu)]TiCH_2 [o-PhN(Me_2)]$, $Cp_2 Fe B(C_6 F_5)_4$.

The elastomeric ethylene/$C_4$ to $C_8$ copolymer, preferably obtained with the single site catalyst, preferably has a density in the range of 0.80 to 0.93 g/cm$^3$, and especially in the range of 0.86 to 0.91 g/cm$^3$. In addition the polymer preferably has a melt index MFR2(190° C.) of less than 5 g/10 min, particularly in the range of 0.3 to 2 g/10 min and especially in the range of 0.5 to 1.5 g/10 min. Preferred polymers include ethylene/butene-1, ethylene/hexene-1, ethylene/octene-1 and ethylene/hexene-1/butene-1 copolymers.

The production of elastomeric ethylene/1-octene copolymers is also described in detail in: Chum S P, Kao C I and Knight G W: Structure, properties and preparation of polyolefins produced by single-site technology. In: Metallocene-based Polyolefins—Volume 1, Scheirs J and Kaminsky W Eds, John Wiley and Sons Ltd, Chichester (West Sussex, England), 2000 pp. 262-264.

Alternatively, elastomeric ethylene/$C_4$ to $C_8$ copolymers, which are commercially available and which fulfil the indicated requirements, can be used.

In general, it is preferred that the first elastomeric phase is non-crosslinked.

As used in the present invention, the term "crosslinking" refers to polymer chains connected to each other by the formation of chemical bonds, thereby generating an elastomeric material. In non-crosslinked elastomers, the elastomeric properties result from physical entanglement of polymeric chains.

Preferably, the first elastomeric phase is present in an amount of 5 to 40 wt %, more preferably 10 to 35 wt %, even more preferably 15 to 30 wt %, based on the weight of the polymer composition.

The first elastomeric phase has a glass transition temperature Tg1. As known to the skilled person, the glass transition temperature depends on the type of elastomeric polymer, the molecular weight, the type and amount of comonomers being present within the elastomeric polymer.

As explained in "Handbook of Polyolefins", 2$^{nd}$ edition, 2000, pp. 217-218, the glass transition temperature of a specific ethylene/$C_3$ to $C_8$ olefin, e.g. an ethylene/propylene rubber (EPR), can be further fine-tuned by varying the comonomer content.

As will be explained below in further detail, the glass transition temperature of the first elastomeric phase can be chosen arbitrarily, provided that the difference between Tg1 and Tg2, which is the glass transition temperature of a second elastomeric phase defined below, is at least 15° C., and Tg1 of the first elastomeric phase is higher than Tg2 of the second elastomeric phase.

Preferably, the first elastomeric phase, e.g. the ethylene copolymer such as EPR, ethylene/$C_4$-$C_8$ copolymer, preferably ethylene/1-octene copolymer, or EPDM, has a glass transition temperature Tg1 within the range of −40° C. to −70° C., more preferably −45° C. to −65° C. In further preferred embodiments, the first elastomeric phase has a glass transition temperature Tg1 within the range of −50° C. to −60° C., in particular if the first elastomeric phase is EPR, or alternatively within the range of −58° C. to −64° C., in particular if the first elastomeric phase is an ethylene/$C_4$-$C_8$ copolymer such as an ethylene/1-octene copolymer.

The Second Elastomeric Phase

As indicated above, the polymer composition of the present invention comprises a second elastomeric phase dispersed within the polypropylene matrix, wherein the second elastomeric phase is crosslinked and has a glass transition temperature Tg2 within the range of −70° C. to −90° C.

As already indicated above, there are measures known to the skilled person for adjusting glass transition temperature of a polymeric material, such as type and amount of comonomers, molecular weight, degree of crosslinking, or microstructure of the polymer.

As used in the present invention, the term "crosslinking" refers to polymer chains connected to each other by the formation of chemical bonds, thereby generating an elastomeric material. In addition to crosslinking, the polymer chains of the second elastomeric phase may also show entanglement which contributes as well to the elastomeric properties.

Preferably, the second elastomeric phase comprises a crosslinked polymer derived from multifunctionally, more preferably bifunctionally unsaturated monomers.

The term "multifunctionally unsaturated" and "bifunctionally unsaturated", respectively, as used in the context of the present invention, means the presence of two or more non-aromatic double bonds.

Preferably, the bifunctionally unsaturated monomer is selected from the group consisting of dienes, such as 1,3-butadiene, chloroprene, isoprene, 1,4-pentadiene, cyclopentadiene, cyclohexadiene, 2,3-dimethylbutadiene, heptadiene, hexadiene, allyl compounds such as allyl acrylate, allyl methacrylate, allyl methyl maleate, allyl vinyl ether, divinyl compounds such as m- or p-divinylbenzene, divinylpentane, divinylpropane, divinylaniline, or any mixture thereof.

Exemplary crosslinked elastomeric polymers include crosslinked polybutadiene, butadiene/acrylic acid $C_{1-4}$ alkyl ester copolymers, polyisoprene, random styrene/butadiene copolymers, fluorinated rubber, acrylate rubber, polybutadiene/acrylonitrile copolymers, carboxylated nitrile rubbers, polychloroprene, isobutylene/isoprene copolymers (optionally brominated and/or chlorinated), ethylene/propylene/diene copolymers, ethylene/acrylate copolymers, ethylene/vinyl acetate copolymers, epichlorohydrin rubbers, silicone rubbers, polyester-urethane polymers, polyether-urethane polymers, epoxidized natural rubbers, or any mixture thereof.

Preferably, the elastomeric crosslinked polymer is polybutadiene.

In "Kautschuktechnologie", $2^{nd}$ edition, pp. 77-80, it is described how to adjust Tg of polybutadiene by varying microstructure (cis-1,4-polybutadiene, trans-1,4-polybutadiene, 1,2-polybutadiene) and type of catalyst system. These measures for fine-tuning glass transition temperature are known to the skilled person and can also be applied to the crosslinked elastomeric polymers listed above, such as polyisoprene etc.

Preferably, the second elastomeric phase is present in an amount of 1 to 20 wt %, more preferably 3 to 17 wt %, even more preferably 5 to 15 wt %, based on the weight of the polymer composition.

The preparation of crosslinked elastomeric polymers such as those listed above is well-known, see e.g. DE 103 45 043 A1 (e.g. pp. 7-10), EP-A-405 216, EP-A-854171, DE-A 4220563, GB-PS 1078400, DE 197 01 489.5, DE 197 01 488.7, DE 198 34 804.5, DE 198 34 803.7, DE 198 34 802.9, DE 199 29 347.3, DE 199 39 865.8, DE 199 42 620.1, DE 199 42 614.7, DE 100 21 070.8, DE 100 38 488.9, DE 100 39 749.2, DE 100 52 287.4, DE 100 56 311.2 and DE 100 61 174.5.

Preferably, the second elastomeric phase is obtained by emulsion polymerisation, preferably in the presence of a peroxide radical initiator to effect crosslinking.

Preferably, emulsion polymerisation is carried out in the presence of an organic peroxide such as dicumyl peroxide, t-butyl cumyl peroxide, bis-(t-butylperoxyisopropyl)benzene, di-t-butyl peroxide, 2,5-dimethylhexane-2,5-dihydroperoxide, 2,5-dimethylhexine-3,2,5-dihydroperoxide, dibenzoyl peroxide, and bis-(2,4-dichlorobenzoyl)peroxide. Further initiators that can be mentioned include t-butyl perbenzoate, organic azo compounds as well as di- and polymercapto compounds.

Preferably, the second elastomeric phase is present in the form of discrete particles. Preferably, these have a mean particle size in the range of 50 to 800 nm, more preferably 250 to 500 nm.

According to the present invention, the difference between Tg1 and Tg2 is at least 15° C., and the glass transition temperature Tg2 of the second elastomeric phase is lower than the glass transition temperature Tg1 of the first elastomeric phase.

By providing two elastomeric phases as defined above within the polypropylene matrix which differ at least by 15° C. in their glass transition temperatures, a polymer composition of improved impact strength, in particular at low temperature, is obtained. If the glass transition temperatures of the dispersed elastomeric phases coincide or there is only a slight difference between these glass transition temperatures, in particular less than 15° C., no significant improvement in low temperature impact strength is obtained.

Preferably, the difference between Tg1 and Tg2 is at least 18° C., more preferably at least 20° C.

On the other hand, it is preferred that the difference between Tg1 and Tg2 is 45° C. or less. In other preferred embodiments, the difference between Tg1 and Tg2 is 40° C. or less, 35° C. or less, 30° C. or less, or 25° C. or less.

In a preferred embodiment, the difference between Tg1 and Tg2 is from 15° C. to 45° C. In other preferred embodiments, the difference between Tg1 and Tg2 is from 15° C. to 40° C., 15° C. to 35° C., 15° C. to 30° C., 15° C. to 25° C., 18° C. to 45° C., 18° C. to 40° C., 18° C. to 35° C., 18° C. to 30° C., or 18° C. to 25° C.

As indicated above, Tg2 is within the range of −70° C. to −90° C. Preferably, the second elastomeric phase has a glass transition temperature Tg2 within the range of −75 to −85° C., more preferably −78° C. to −83° C.

In a particular preferred embodiment, the polymer composition comprises a propylene homo- or copolymer matrix as described above, a first elastomeric phase comprising an ethylene/$C_3$-$C_8$ copolymer, preferably an ethylene/propylene rubber or an ethylene/1-octene copolymer, and having a glass transition temperature Tg1 of −40° C. to −70° C., preferably −45° C. to −65° C., a second elastomeric phase comprising a crosslinked polybutadiene and having a glass transition temperature Tg2 of −70° C. to −90° C., preferably −75° C. to −85° C. Preferably, the first elastomeric phase consists of an ethylene/$C_3$-$C_8$ copolymer and the second elastomeric phase consists of a crosslinked polybutadiene, wherein the first elastomeric phase is present in an amount of 5 to 40 wt %, more preferably 10 to 35 wt % and the second elastomeric phase is present in an amount of 1 to 20 wt %, more preferably 3 to 17 wt %, based on the weight of the polymer composition.

Preferably, the polymer composition of the present invention has a notched Charpy impact strength at −20° C. of at least 4.0 kJ/m$^2$, more preferably at least 4.5 kJ/m$^2$.

In a preferred embodiment, the polymer composition comprises a polypropylene matrix as defined above with an elastomeric ethylene/propylene composition as defined above dispersed therein, preferably by reactor blending, wherein the polymer composition has a notched Charpy impact strength at −20° C. of at least 11.5 kJ/m$^2$, more preferably at least 12.0 kJ/m$^2$, even more preferably at least 13.0 kJ/m$^2$, and most preferably at least 13.5 kJ/m$^2$. Preferably, the polymer composition has the notched Charpy impact strength values indicated above and simultaneously has a flexural modulus of at least 650 MPa, more preferably at least 690 MPa.

Optional Additives

The polymer composition of the present invention may further comprise conventional additives such as antioxidants, stabilizers, plasticizers, acid scavengers, colouring agents, nucleating agents, fillers, etc. Typically, each of these additives may be present in an amount of 2 wt % or less, more preferably less than 1 wt %, even more preferably less than 0.5 wt %, based on the weight of the polymer composition.

Process for Preparing the Polymer Composition

The polymer composition according to the present invention is obtained by dispersing the first and second elastomeric phase within the polypropylene matrix. Preferably, the second elastomeric phase is crosslinked prior to dispersion and subsequently dispersed within the propylene homo- or copolymer constituting the matrix. If the second elastomeric phase is crosslinked prior to dispersion, its morphology is fixed, e.g. in the form of discrete, preferably spherical particles, and does not change anymore during the dispersion step. Dispersion of the crosslinked second elastomeric phase within the polypropylene matrix can be accomplished via known procedures such as melt blending, e.g. in an extruder.

Preferably, the first elastomeric phase is in situ dispersed within the propylene homo- or copolymer constituting the matrix by reactor blending. Reactor blending has already described above in further detail. When dispersion is accomplished via reactor blending, the first elastomeric phase preferably comprises an ethylene/$C_3$-$C_8$ copolymer, more preferably an elastomeric ethylene/propylene copolymer (EPR) as defined above.

As an alternative, the first elastomeric phase, preferably the elastomeric ethylene/$C_3$-$C_8$ copolymer such as the ethylene/1-octene copolymer as defined above, can be prepared separately, followed by dispersion within the propylene homo- or copolymer constituting the matrix. Dispersion of the first elastomeric phase within the polypropylene matrix can be accomplished via known procedures such as melt blending, e.g. in an extruder.

Further Aspects of the Present Invention

According to a further aspect of the present invention, there is provided a shaped article, comprising the polymer composition as described above.

Preferably, these articles are body parts for automotive applications, either interior or exterior parts. The parts may be bumper covers, fascia, air dams and other trim, dash boards, air bag covers etc.

According to another preferred embodiment, these articles are packaging means or crate boxes.

According to a further aspect, the present invention relates to the use of the polymer composition as defined above for improving impact strength, in particular low temperature impact strength.

Considering the discussion provided above, the present invention relates to the embodiments listed below in sections (001) to (032):

(001) A polymer composition, comprising
  (i) a polypropylene matrix,
  (ii) a first elastomeric phase dispersed within the matrix and having a glass transition temperature Tg1,
  (iii) a second elastomeric phase dispersed within the matrix, wherein the second elastomeric phase is crosslinked and has a glass transition temperature Tg2, wherein the difference between Tg1 and Tg2 is at least 15° C.

(002) The polymer composition according to section (001), wherein the first elastomeric phase comprises an elastomeric olefinic copolymer having monomer units derived from ethylene and/or $C_3$ to $C_8$ olefins.

(003) The polymer composition according to section (002), wherein the elastomeric olefinic copolymer is an ethylene copolymer having comonomer units derived from $C_3$ to $C_8$ olefins.

(004) The polymer composition according to section (003), wherein the ethylene copolymer is an ethylene/propylene copolymer.

(005) The polymer composition according to section (004), wherein the ethylene/propylene copolymer has an amount of propylene units in the range of 25 to 75 wt %, based on the weight of the ethylene/propylene copolymer.

(006) The polymer composition according to section (004) or (005), wherein the ethylene/propylene copolymer is prepared as a reactor blend together with the propylene homo- or copolymer constituting the matrix.

(007) The polymer composition according to section (006), wherein the reactor blend has a $MFR_2$(230° C.) within the range of 1 to 100 g/10 min.

(008) The polymer composition according to section (003), wherein the ethylene copolymer has comonomer units derived from 1-butene, 1-hexene, 1-octene, or any mixture thereof.

(009) The polymer composition according to section (008), wherein the ethylene copolymer has an amount of comonomer units within the range of 5 to 50 wt %, based on the weight of the ethylene copolymer.

(010) The polymer composition according to one of the preceding sections, wherein the first elastomeric phase is non-crosslinked.

(011) The polymer composition according to one of the preceding sections, wherein the first elastomeric phase is present in an amount of 5 to 40 wt %, based on the weight of the polymer composition.

(012) The polymer composition according to one of the preceding sections, wherein the glass transition temperature Tg1 of the first elastomeric phase is higher than the glass transition temperature Tg2 of the second elastomeric phase.

(013) The polymer composition according to one of the preceding sections, wherein the first elastomeric phase has a glass transition temperature Tg1 within the range of −40° C. to −70° C.

(014) The polymer composition according to one of the preceding sections, wherein the second elastomeric phase comprises an elastomeric crosslinked polymer derived from bifunctionally unsaturated monomers.

(015) The polymer composition according to section (014), wherein the bifunctionally unsaturated monomer is selected from the group consisting of dienes, allyl compounds, divinyl compounds, or any mixture thereof.

(016) The polymer composition according to section (015), wherein the crosslinked polymer is selected from polybutadiene.

(017) The polymer composition according to one of the preceding sections, wherein the second elastomeric phase is present in an amount of 1 to 20 wt %, based on the weight of the polymer composition.

(018) The polymer composition according to one of the preceding sections, wherein the second elastomeric phase is obtained by emulsion polymerisation in the presence of a peroxide radical initiator to effect crosslinking.

(019) The polymer composition according to one of the preceding sections, wherein the second elastomeric phase is present in the form of discrete particles having a mean particle size in the range of 50 to 800 nm.

(020) The polymer composition according to one of the preceding sections, wherein the second elastomeric phase has a glass transition temperature Tg2 within the range of −70° C. to −90° C.

(021) The polymer composition according to one of the preceding sections, wherein the polypropylene constituting the matrix is a propylene homopolymer.

(022) The polymer composition according to one of the sections (001) to (020), wherein the polypropylene constituting the matrix is a propylene copolymer having comonomer units derived from ethylene, $C_4$ to $C_{20}$ olefins, or any mixture thereof.

(023) The polymer composition according to one of the preceding sections, wherein the propylene homo- or copolymer constituting the matrix has a $MFR_2$(230° C.) within the range of 1 to 100 g/10 min.

(024) The polymer composition according to one of the preceding sections, wherein the propylene homo- or copolymer constituting the matrix is present in an amount of at least 60 wt %, based on the weight of the polymer composition.

(025) A process for the preparation of the polymer composition according to one of the sections (001) to (024), wherein the first and second elastomeric phase are dispersed within the propylene homo- or copolymer constituting the matrix.

(026) The process according to section (025), wherein the second elastomeric phase is crosslinked prior to dispersion and subsequently dispersed within the propylene homo- or copolymer constituting the matrix.

(027) The process according to section (025) or (026), wherein the first elastomeric phase is in situ dispersed within the propylene homo- or copolymer constituting the matrix by reactor blending.

(028) The process according to section (027), wherein the first elastomeric phase is an elastomeric ethylene/propylene copolymer as defined in one of the sections (004) to (007) and (010) to (013).

(029) The process according to section (025) or (026), wherein the first elastomeric phase is prepared separately, followed by dispersion within the propylene homo- or copolymer constituting the matrix.

(030) A shaped article, comprising the polymer composition according to one of the sections (001) to (024).

(031) The shaped article according to section (030), wherein the article is selected from exterior and/or interior body parts for automotive applications, packaging means, crate boxes.

(032) Use of the polymer composition according to one of the sections (001) to (024) for improving impact strength, in particular low temperature impact strength of shaped polymer articles.

The present invention will now be described in further detail by making reference to the examples outlined below.

EXAMPLES

Measuring Methods

The following measuring methods have been used in the present invention, if not explicitly stated otherwise.

1. Mw, Mn, MWD

Weight average molecular weight (Mw), number average molecular weight (Mn) and thus molecular weight distribution (MWD=Mw/Mn) was determined by size exclusion chromatography (SEC) based on standard test methods ISO 16014-2:2003 and ISO 16014-4:2003.

The molecular weight averages and molecular weight distribution were measured on a Waters Alliance GPCV2000 SEC instrument with on-line viscometer at 140 degrees Celsius using 1,2,4-trichlorobenzene (TCB) stabilized with 2,6-di-tert-butyl-4-methylphenol (BHT) as an eluent. A set of two mixed beds and one 107 Å TSK-Gel columns from TosoHaas was used and the system was calibrated with NMWD polystyrene standards (from Polymer laboratories).

2. Melt Flow Rate (MFR)

The melt flow rates were measured with a load of 2.16 kg ($MFR_2$) at 230° C. for polypropylene and at 190° C. for polyethylene. The melt flow rate is that quantity of polymer in grams which the test apparatus standardised to ISO 1133 extrudes within 10 minutes at a temperature of 230° C. or 190° C. respectively, under a load of 2.16 kg.

3. Comonomer Content

Comonomer content (wt %) can be determined in a known manner based on Fourier transform infrared spectroscopy (FTIR) determination calibrated with $^{13}C$-NMR.

4. Charpy Notched Impact Strength

The Charpy notched impact strength was determined according to ISO 179/1eA at 23° C. and at −20° C. by using injection moulded test specimens as described in EN ISO 1873-2 (80×10×4 mm).

5. Particle Sizes

Particle sizes were determined according to the following procedure:

1) sample specimens were stained with gaseous RuO4 according to a procedure described in: Montezinos, D.; Wells, B. G.; Burns, J. L.: Polym. Sci. Polym. Lett. Ed. 1985, 23, 421-452.

2) transmission electron micrographs were recorded with a Philips 300. The picture was taken in the core section of injection moulded specimens as described in EN ISO 1873-2 (80×10×4 mm) with the cut perpendicular to flow direction.

3) particle size evaluation was performed using the software PC image 2.2.05 of Foster Findlay Associates (Newcastle upon Tyne, U.K.). First a binary picture was produced by setting a threshold value. The threshold value depends on the actual picture, but was about 150 for each of the pictures. Then the filter operations Holefill and Open were used. The number of passes for the Open function also depends on the picture and was from 1-3 for each of the pictures.

An exact description of each function can be found in the literature: Russ J C: The Image Processing Handbook. CRC Press London Tokyo, 1995, 2nd ed.

Particle Size Determination of Disperse Phase

The particle size distribution of the dispersed polymer phase is determined from scanning electron micrographs, for which specimens of the respective materials are contrasted with ruthenium tetroxide (RuO4) and cut, then investigated in an electron microscope. Uncorrected profile size distributions are assumed to represent the particle size distribution. Weight average particle sizes are subsequently calculated from these distributions. Details of such determinations are described in the literature (see Poelt et al. J. Appl. Polym. Sci. 78, 2000, 1152-61).

6. Glass Transition Temperature

Glass transition temperatures Tg are determined with Dynamic Mechanical Thermal Analysis (DMTA). The tests are carried out in accordance with ISO 6721-2 on specimens of 60×10×1 mm cut from compression moulded plaques. In a measurement at 1 Hz (free oscillation) a temperature range of at least −100 to +150° C. is covered, using a heating rate of 1° C./min. The storage modulus G' and the tangent of the loss angle tan(d) are the primary results of the tests; from tan(d) the temperatures—peak position and peak broadness—of the various mobility transitions, such as the glass transition temperature Tg, in the systems, which can be attributed to the phases present, are determined.

7. Flexural Modulus

Flexural modulus: was measured according to ISO 178 (room temperature, if not otherwise mentioned) by using injection moulded test specimens as described in EN ISO 1873-2 (80×10×4 mm).

8. Xylene Solubles (XS, wt %)

The content of xylene solubles (XS) was determined at 23° C. according to ISO 6427.

9. Intrinsic Viscosity

The intrinsic viscosity (IV) was determined according to ISO 1628-1 at 135° C. with decaline as solvent.

EXPERIMENTS

Example 1 (Ex1) and Comparative Examples 1-3 (CE1-3)

In all these examples, a propylene homopolymer with $MFR_2$ (230° C.)=10 g/10 min, Mw=330,000 g/mol and MWD=5.2, was used as the matrix polymer.

In CE1, only a single non-crosslinked elastomeric phase made of ethylene/1-octene copolymer (EOC) was dispersed in the matrix polymer. The EOC had 42 wt % $C_8$ units, a density of 0.863 g/cm$^3$, and $MFR_2$(190° C.)=0.5 g/10 min.

In CE2, only a single crosslinked elastomeric phase made of a crosslinked polybutadiene rubber (designated as microgel 2 with an average particle size of 400 nm) was dispersed in the matrix polymer.

In CE3, an elastomeric EOC phase as used in CE1 as well as a crosslinked polyisoprene rubber (designated as microgel 1 with an average particle size of 400 nm) were dispersed in the matrix polymer.

In Ex1, an elastomeric EOC phase as used in CE1 as well as a crosslinked polybutadiene rubber (designated as microgel 2) were dispersed in the matrix polymer.

The final polymer composition was obtained as follows:

The matrix polymer, the EOC and/or the microgel particles were dosed separately into a twin screw extruder Prism TSE24 40D with a temperature profile 80/200/210/220/220/230/230/220/225/220° C. and a screw speed of 300 rpm. The polymer mixture was heated and melted in the extruder zones 1, 2 and 3. The polymer melt was passed through the extruder, then to intensive devolatilisation, discharged and pelletised.

The results are summarised in Table 1.

TABLE 1

PP/EOC/micro gels

|  |  | CE1 | CE2 | CE3 | EX1 |
|---|---|---|---|---|---|
| HomoPP |  | matrix | matrix | matrix | matrix |
| EOC | % | 20 |  | 10 | 10 |
| Microgel 1 | % |  |  | 10 |  |
| Microgel 2 | % |  | 20 |  | 10 |
| MFR2 | g/10 min | 6.6 | 3.6 | 4.7 | 4.3 |
| FLEXURAL MODULUS | MPa | 1110 | 1081 | 1097 | 1083 |
| FLEXURAL STRENGTH | MPa | 30.1 | 28 | 29 | 28.8 |
| IMPACT STRENGTH (NIS) RT | kJ/m² | 7.8 | 4.4 | 8.9 | 9 |
| IMPACT STRENGTH (NIS) −20° C. | kJ/m² | 3.1 | 2.2 | 3.8 | 4.7 |
| G' AT 23° C. | MPa | 596 | 563 | 597 | 591 |
| PEAK1 TAN_D | ° C. | 0 | 0 | 0 | 0 |
| PEAK2 TAN_D | ° C. | −61 | −81 | −61 | −61 |
| PEAK3 TAN_D | ° C. |  |  |  | −81 |

Peak2 and Peak3 in Table 1 correspond to the glass transition temperature of the dispersed phase(s). The results of the DMTA measurements are also shown in FIG. 1. In CE1 and CE2, there is only a single elastomeric phase dispersed within the matrix. Consequently, there is only a single glass transition temperature resulting from the dispersed phase. In CE3, the glass transition temperatures of the dispersed phases coincide. Again, only a single glass transition temperature can be observed. In Ex1, the glass transition temperature of the first elastomeric phase (EOC) and the second elastomeric phase (crosslinked polybutadiene rubber) differ by more than 15° C.

All samples exhibit almost the same stiffness level of around 1100 MPa. With regard to impact strength at room temperature, a combination of crosslinked dispersed phase and non-crosslinked dispersed phase provides the best performance (see CE3 and Ex1). However, with respect to low temperature impact strength, there is a significant improvement if the glass transition temperatures of the dispersed phases differ by at least 15° C. (Ex1).

Example 2 and Comparative Examples 4-6

In all these examples, an impact polypropylene was used. The impact PP is a reactor blend of a propylene homopolymer and an ethylene/propylene rubber dispersed therein. The dispersed EPR represents the first elastomeric phase. The impact polypropylene was produced in a multistage polymerization process consisting of 1 loop reactor and 1 gas phase reactors using a conventional Ziegler Natta catalyst system as known in the art. In the loop reactor, a propylene homopolymer with a MFR of 25 g/10 min was produced. The polymer was transferred to the gas phase reactor, where the EPR phase was produced. The final composition had a MFR value of 7.5 g/10 min, a XS value of 25 wt.-% and the intrinsic viscosity of the xylene soluble part was 2.8 dl/g. The ethylene content of the xylene soluble part was 43.0 wt.-%.

In CE4, no additional elastomeric phase is dispersed within the matrix.

In CE5, a non-crosslinked elastomeric phase made of ethylene/1-octene copolymer (EOC) was additionally dispersed in the matrix polymer. The EOC had 42 wt % C8 units, a density of 0.863 g/cm³, and MFR₂(190° C.)=0.5 g/10 min.

In CE6, a crosslinked polyisoprene rubber (designated as microgel 1) was additionally dispersed in the matrix polymer.

In Ex2, a crosslinked polybutadiene rubber (designated as microgel 2) was additionally dispersed in the matrix polymer.

The results are summarised in Table 2.

TABLE 2

Micro gels in impact PP

|  |  | CE4 | CE5 | CE6 | EX2 |
|---|---|---|---|---|---|
| Impact PP | % | matrix | matrix | matrix | matrix |
| EOC | % |  | 10 |  |  |
| Microgel 1 | % |  |  | 10 |  |
| Microgel 2 | % |  |  |  | 10 |
| MFR | g/10 min | 7.5 | 7.3 | 4.2 | 4.1 |
| FLEXURAL MODULUS | MPa | 877 | 714 | 687 | 701 |
| FLEXURAL STRENGTH | MPa | 22.9 | 18.5 | 17.6 | 17.6 |
| IMPACT STRENGTH (NIS) RT | kJ/m² | 43.8 | 70.3 | 53.9 | 66.5 |
| IMPACT STRENGTH (NIS) −20° C. | kJ/m² | 7.7 | 11 | 8.6 | 13.7 |
| G' AT 23° C. | MPa | 491 | 407 | 361 | 338 |
| PEAK1 TAN_D | ° C. | 0 | 0 | 0 | 0 |

TABLE 2-continued

| Micro gels in impact PP | | CE4 | CE5 | CE6 | EX2 |
|---|---|---|---|---|---|
| PEAK2 TAN_D | ° C. | −58 | −58 | −58 | −58 |
| PEAK3 TAN_D | ° C. | | | | −81 |

Peak2 and Peak3 in Table 2 correspond to the glass transition temperature of the dispersed phase(s). The results of the DMTA measurements are also shown in FIG. 2. In CE4, there is only a single elastomeric phase dispersed within the matrix (the EPR rubber). Consequently, there is only a single glass transition temperature resulting from the dispersed phase. In CE5 and CE6, the glass transition temperatures of the dispersed phases coincide. Thus, in both samples only a single glass transition temperature can be observed. In Ex2, the glass transition temperature of the first elastomeric phase (EPR) and the second elastomeric phase (crosslinked polybutadiene rubber) differ by more than 15° C.

The results of Table 2 confirm that impact strength at low temperature can be significantly improved if the glass transition temperatures of the dispersed phases differ by at least 15° C. (Ex2).

We claim:

1. A polymer composition, comprising
    (i) a polypropylene matrix, wherein the polypropylene matrix is present in an amount of at least 60 wt %, based on the weight of the polymer composition, and said polypropylene matrix has a melt flow rate (MFR) of 10-30 g/10 min and a molecular weight distribution (MWD) of 5-8,
    (ii) a first elestomeric phase dispersed within the matrix and having a glass transition temperature Tg1, measured with dynamical mechanical thermal analysis according to ISO 6721-2, within the range of −58° C. to −64° C. wherein the first elastomeric phase comprises an ethylene copolymer having comonomer units derived from $C_3$ to $C_8$ olefins, wherein the intrinsic viscosity of the first elastomeric phase is 1 to 3.5 dl/g to provide high impact strength at low temperature, wherein the first elastomeric phase is non-crosslinked, wherein the first elastomeric phase is present in an amount of 10 to 30 wt % based on the weight of the polymer composition,
    (iii) a second elastomeric phase dispersed within the matrix, wherein the second elestomeric phase is crosslinked polybutadiene, and has a glass transition temperature Tg2, measured with dynamical mechanical thermal analysis according to ISO 6721-2, within the range of −75° C. to −85° C., wherein the second elastomeric phase is present in the form of discrete particles having a mean particle size from 250 to 500 nm, wherein the second elestomeric phase is present in an amount of 10 to 17 wt % based on the weight of the polymer composition,
        wherein the difference between Tg1 and Tg2 is at least 20° C. to 25° C.

2. The polymer composition according to claim 1, wherein the ethylene copolymer is an ethylene/propylene copolymer.

3. The polymer composition according to claim 2, wherein the ethylene/propylene copolymer has an amount of propylene units in the range of 25 to 75 wt %, based on the weight of the ethylene/propylene copolymer.

4. The polymer composition according to claim 1, wherein the ethylene copolymer has comonomer units derived from 1-butene, 1-hexene, 1-octene, or any mixture thereof.

5. The polymer composition according to claim 4, wherein the ethylene copolymer has an amount of comonomer units within the range of 5 to 50 wt %, based on the weight of the ethylene copolymer.

6. The polymer composition according to claim 1, wherein the polypropylene constituting the matrix is selected from the group consisting of propylene homopolymer, and a propylene copolymer having comonomer units derived from ethylene and/or C4 to C20.

7. The polymer composition according to claim 6, wherein the propylene homo- or copolymer constituting the matrix is present in an amount of at least 80 wt %, based on the weight of the polymer composition.

8. A process for the preparation of a polymer composition comprising
    (i) providing a polypropylene matrix, wherein the polypropylene constituting the matrix is selected from the group consisting of a propylene homopolymer, a propylene copolymer having comonomer units derived from ethylene and/or $C_4$ to $C_{20}$ olefins, and any mixture thereof, wherein the polypropylene matrix is present in an amount of at least 60 wt %, based on the weight of the polymer composition; and said polypropylene matrix has a melt flow rate (MFR) of 10-30 g/10 min and a molecular weight distribution (MWD) of 5-8,
    (ii) providing a first elastomeric phase for disparing within the matrix and having glass transition temperature Tg1, measured with dynamical mechanical thermal analysis according to ISO 6721-2, within the range of −58° C. to −64° C., wherein the first elastomeric phase comprises an ethylene copolymer having comonomer units derived from $C_3$ to $C_8$ olefins, wherein the first elastomeric phase is non-crosslinked, wherein the first elastomeric phase is present in an amount of 10 to 30 wt %, based on the weight of the polymer composition;
    (iii) providing a second phase for dispersing within the matrix, wherein the second elastomeric phase is crosslinked polybutadiene and has a glass transition temperature Tg2, measured with dynamical mechanical thermal analysis according to ISO 6721-2, within the range of −75° C. to −85° C., wherein the second elastomeric phase, is present in the form of discrete particles having a mean particle size from 250 to 500 nm, wherein the second elastomeric phase is present in an amount of 10 to 17 wt %, based on the weight of the polymer composition,
        whereiin the differnce between Tg1 and Tg2 is at least 20° C. to 25° C.,
        dispersing the first and the second elastomeric phases within the propylene homo- or copolymer constituting the matrix, wherein the first elastomeric phase is prepared separately, followed by the dispersion within the propylene homo- or copolymer constituting the matrix.

9. The process according to claim 8, wherein the second elastomeric phase is crosslinked prior to dispersion and subsequently dispersed within the propylene homo- or copolymer constituting the matrix.

10. A process for the preparation of polymer composition comprising
  (i) providing a polypropylene matrix, wherein the polypropylene constituting the matrix is selected from the group consisting of a propylene homopolymer, a propylene copolymer having comonomer units derived from ethylene and/or $C_4$ to $C_{20}$ olefins, and any mixture thereof, wherein the polypropylene matrix is present in an amount of at least 60 wt %, based on the weight of the polymer composition; and said polypropylene matrix has a melt flow rate (MFR) of 10-30 g/10 min and a molecular weight distribution (MWD) of 5-8,
  (ii) providing a first elastomeric phase for dispersing within the matrix and having glass transition temperature Tg1, measured with dynamical mechanical thermal analysis according to ISO 6721-2, within the range of −58° C. to −64° C., wherein the first elestomeric phase comprises an ethylene copolymer having copolymer units derived from $C_3$ to $C_8$ olefins, wherein the first elastomeric phase is non-crosslinked, wherein the first elastomeric is present in an amount 10 to 30 wt %, based on the weight of the polymer composition, wherein the first elastomeric phase is in situ dispersed within the propylene homo- or copolymer constituting the matrix by reactor blending;
  (iii) providing a second elestomeric phase for dispersing within the matrix, wherein the second elastomeric phase is crosslinked polybutadiene and had a glass transition temperature Tg2, measured with dynamical mechanical thermal analysis according to ISO 6721-2, within the range of −75° C. to −85° C., wherein the second elastomeric phase is present in form of discrete particles having a mean particle ratze from 250 to 500 nm, wherein the second elastomeric phase is present in an amount of 10 to 17 based on the weight of the polymer composition,
  (iv) dispersing the second elastomeric phase within the propylene homo or copolymer constituting the matrix, wherein the difference between Tg1 and Tg2 is at least 20° C. to 25° C.

11. A shaped article, comprising a polymer composition comprising
  (i) a polypropylene matrix, wherein the polypropylene matrix is present in an amount of at least 60 wt %, based on the weight of the polymer composition; and said polypropylene matrix has a melt flow rate (MFR) of 10-30 g/10 min and a molecular weight distribution (MWD) of 5-8,
  (ii) a first elastomeric phase dispersed within the matrix and having a glass transition temperature Tg1, measured with dynamical mechanical thermal analysis according to ISO 6721-2, within the range of −58° C. to −64° C., wherein the first elastomeric phase comprises an ethylene copolymer having comonomer units derived from $C_3$ to $C_8$ olefins, wherein the first elastomeric phase is non-crosslinked, wherein the first elastomeric phase is present in an amount of 10 to 30 wt %, based on the weight of the polymer composition, wherein the intrinsic viscosity of the first elastomeric phase is 1 to 3.5 dl/g to provide high impact strength at low temperature,
  (iii) a second elastomeric phase dispersed within the matrix, wherein the second elastomeric phase is crosslinked polybutadiene and has a glass transition temperature Tg2, measured with dynamical mechanical thermal analysis according to ISO 6721-2, within the range of −75° C. to −85° C., wherein the second elastomeric phase is present in the form of discrete particles having a mean particle size from 250 to 500 nm, wherein the second elastomeric phase is present in an amount of 10 to 17 wt %, based on the weight of the polymer composition,
wherein the differnce between the Tg1 and Tg2 is at least 20° C. to 25° C.

12. A shaped polymer article made from the composition according to claim 1, wherein shaped polymer article is a part for an interior or exterior automotive application.

* * * * *

UNITED STATES PATENT AND TRADEMARK OFFICE
CERTIFICATE OF CORRECTION

PATENT NO. : 9,040,633 B2  
APPLICATION NO. : 12/734368  
DATED : May 26, 2015  
INVENTOR(S) : Klaus Bernreitner, Tung Pham and Jens Reussner Page 1 of 1

It is certified that error appears in the above-identified patent and that said Letters Patent is hereby corrected as shown below:

Specification

Column 1,
Line 47, "C ≡ C" should be -- C = C --

Column 1,
Line 51, "C ≡ C" should be -- C = C --

Claims

Column 16,
Line 36, Claim 8, "disparing" should be -- dispersing --

Column 17,
Line 33, Claim 10, "ratze" should be -- size --

Column 17,
Line 35, Claim 10, add "wt %" after "17" and before "based"

Signed and Sealed this
Thirty-first Day of May, 2016

Michelle K. Lee
*Director of the United States Patent and Trademark Office*